(12) United States Patent
Bauer

(10) Patent No.: US 9,540,051 B2
(45) Date of Patent: Jan. 10, 2017

(54) TRUCK TAILGATE AND METHOD OF USE

(71) Applicant: KING TAILGATES LLC, Valparaiso, IN (US)

(72) Inventor: Benjamin Philip Bauer, Valparaiso, IN (US)

(73) Assignee: King Tailgates LLC, Valparaiso, IN (US)

( * ) Notice: Subject to any disclaimer, the term of this patent is extended or adjusted under 35 U.S.C. 154(b) by 0 days.

(21) Appl. No.: 14/629,592

(22) Filed: Feb. 24, 2015

(65) Prior Publication Data

US 2015/0239372 A1 Aug. 27, 2015

Related U.S. Application Data

(60) Provisional application No. 61/944,182, filed on Feb. 25, 2014.

(51) Int. Cl.
*B62D 33/03* (2006.01)
*B60J 5/10* (2006.01)
*B60N 2/30* (2006.01)

(52) U.S. Cl.
CPC ............... *B62D 33/03* (2013.01); *B60J 5/108* (2013.01); *B60N 2/3095* (2013.01)

(58) Field of Classification Search
CPC ..... B29C 66/71; B62D 33/0273; B62D 33/02; B60P 3/423; C08L 2666/02; B60N 2/36; B60N 2/3011
USPC ............. 296/57.1, 146.8, 26.08, 26.11, 37.6, 50,296/56, 64; 280/166; 292/DIG. 29, DIG. 43
See application file for complete search history.

(56) References Cited

U.S. PATENT DOCUMENTS

| | | | | | |
|---|---|---|---|---|---|
| 1,161,420 | A | * | 11/1915 | Snelling | A47C 1/16 182/53 |
| 2,702,076 | A | * | 2/1955 | Beardsley | A47C 1/16 297/183.5 |
| 5,215,346 | A | * | 6/1993 | Reitzloff | B62D 33/0273 296/37.6 |
| 5,462,334 | A | * | 10/1995 | Sedorcek | A47C 9/06 297/252 |

(Continued)

OTHER PUBLICATIONS

YouTube.com, Oct. 30, 2013; https://www.youtube.com/watch?v=MKg0mTNNaig.

(Continued)

*Primary Examiner* — Kiran B Patel
(74) *Attorney, Agent, or Firm* — Hartman Global IP Law; Gary M. Hartman; Michael D. Winter

(57) ABSTRACT

A tailgate of a type used in pickup trucks and other vehicles, and a method of operating such a tailgate. The tailgate includes a front/interior side, an oppositely-disposed rear/exterior side, lateral ends, and hinges disposed at the lateral ends and configured for pivotably coupling the tailgate to a vehicle. The tailgate further includes at least a first seat integrated into the tailgate between the front/interior side, the rear/exterior side, and the lateral ends. The seat comprises a seat back defined by a first rotatable portion of the front/interior side, and a seat cushion that is recessed into an interior region of the tailgate between the front/interior and rear/exterior sides. The seat cushion is exposed by rotating the seat back from a closed position in which the seat back is aligned with the front/interior side to an open position in which the seat back is deployed away from the front/interior side.

20 Claims, 2 Drawing Sheets

(56) References Cited

U.S. PATENT DOCUMENTS

| | | | | |
|---|---|---|---|---|
| 5,516,179 | A * | 5/1996 | Tidwell | B60N 2/015 296/63 |
| 5,971,464 | A * | 10/1999 | Davis | B60N 2/3095 296/57.1 |
| 5,975,610 | A * | 11/1999 | Tracy | B62D 33/0273 296/57.1 |
| 6,116,676 | A * | 9/2000 | Edwards | B60N 2/3011 296/64 |
| 6,203,108 | B1 * | 3/2001 | Mattison, Jr. | A47C 1/16 297/252 |
| 6,364,391 | B1 * | 4/2002 | Everett | B62D 33/0273 296/51 |
| 6,588,822 | B1 * | 7/2003 | Duvall, Jr. | B60N 2/3011 296/57.1 |
| D479,499 | S * | 9/2003 | Cameron | D12/196 |
| 6,709,040 | B1 * | 3/2004 | Drew | B60N 2/206 296/65.09 |
| 6,808,231 | B1 * | 10/2004 | Hill | B60R 9/06 296/26.09 |
| 6,824,186 | B2 | 11/2004 | Brown | |
| 6,932,408 | B1 * | 8/2005 | Lyod, Jr. | B60N 2/005 224/521 |
| 7,163,262 | B2 * | 1/2007 | Anglin | A47C 4/04 297/184.15 |
| 7,201,424 | B1 * | 4/2007 | Fournier | B62D 33/0273 296/57.1 |
| 7,290,821 | B1 * | 11/2007 | McCann | B60R 7/14 224/404 |
| 7,347,477 | B2 * | 3/2008 | Carty | B60N 2/3011 296/65.03 |
| 7,354,090 | B1 * | 4/2008 | Pomorski | B60N 2/005 296/26.11 |
| 7,566,085 | B2 * | 7/2009 | Jaskolski | B62D 33/0273 296/37.6 |
| 7,631,934 | B2 * | 12/2009 | Mac Isaac | A47C 4/283 297/217.7 |
| 7,866,743 | B1 | 1/2011 | Russell et al. | |
| D651,820 | S * | 1/2012 | Brown | D6/362 |
| 8,123,271 | B1 * | 2/2012 | Wimberley | B60N 2/3095 296/57.1 |
| 8,714,618 | B1 * | 5/2014 | Heit | B60P 3/423 296/64 |
| 8,783,754 | B1 * | 7/2014 | Peterson | B60N 2/3013 296/66 |
| 9,211,012 | B1 * | 12/2015 | Wilson, II | A47C 1/146 |
| 2003/0071505 | A1 * | 4/2003 | Ferrell, Jr. | B60P 3/36 297/352 |
| 2004/0084927 | A1 * | 5/2004 | Brown | B62D 33/0273 296/65.16 |
| 2004/0262345 | A1 * | 12/2004 | Polburn | B60R 7/005 224/275 |
| 2006/0152029 | A1 * | 7/2006 | Tomasson | B60J 5/103 296/51 |
| 2007/0007789 | A1 * | 1/2007 | Bowden | B60N 3/06 296/64 |
| 2008/0122240 | A1 * | 5/2008 | Leroy | B60R 5/041 296/37.6 |
| 2008/0246298 | A1 * | 10/2008 | Leigh-Monstevens | B60N 2/015 296/64 |
| 2011/0198879 | A1 * | 8/2011 | Kemp | B60N 2/3013 296/66 |
| 2012/0104786 | A1 * | 5/2012 | Wimberley | B60N 2/01508 296/65.16 |
| 2013/0257121 | A1 * | 10/2013 | Otta | B60N 2/015 297/217.1 |
| 2014/0217797 | A1 * | 8/2014 | Heit | B60P 1/04 297/354.1 |

OTHER PUBLICATIONS

Fiat Chrysler Automobiles, SEMA 2013 Preview: RAM 1500 Sun Chaser Walkaround.

* cited by examiner

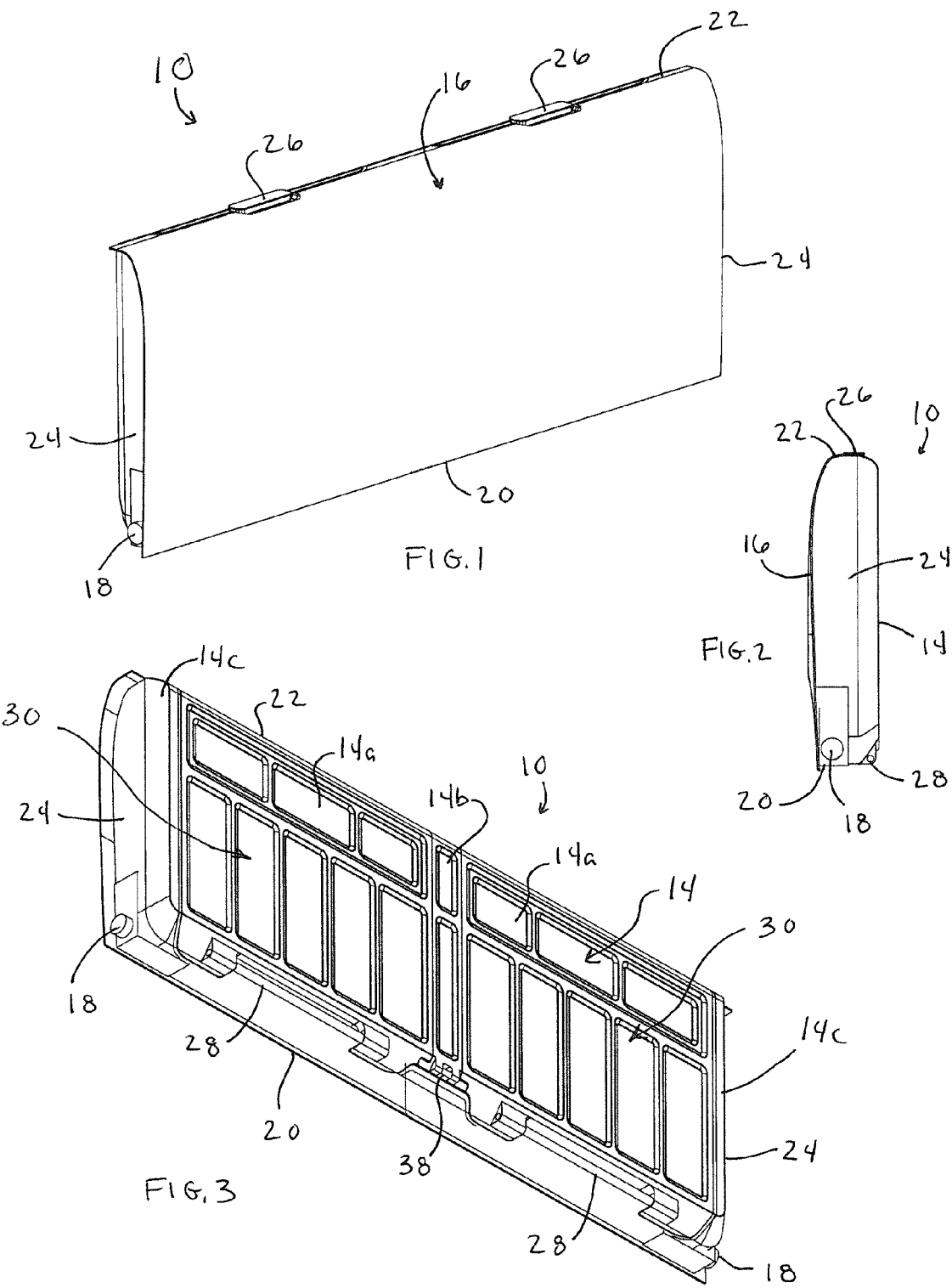

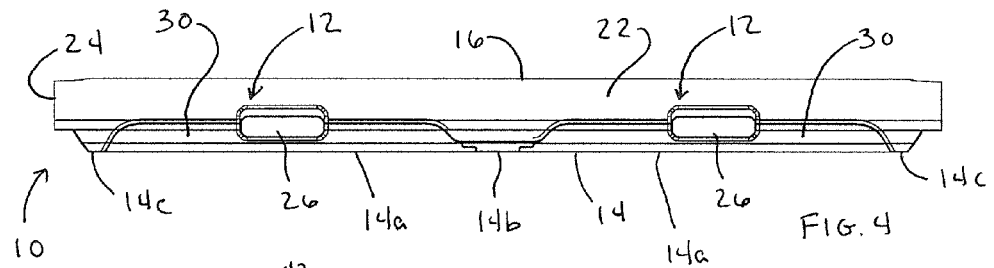
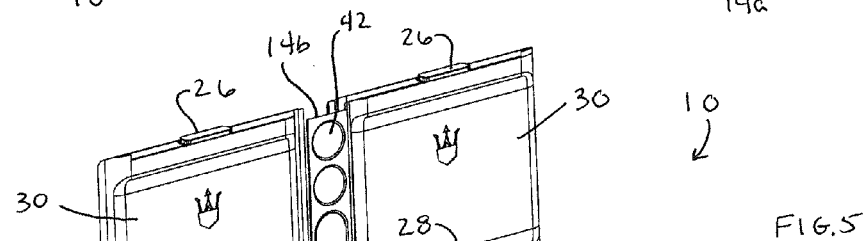
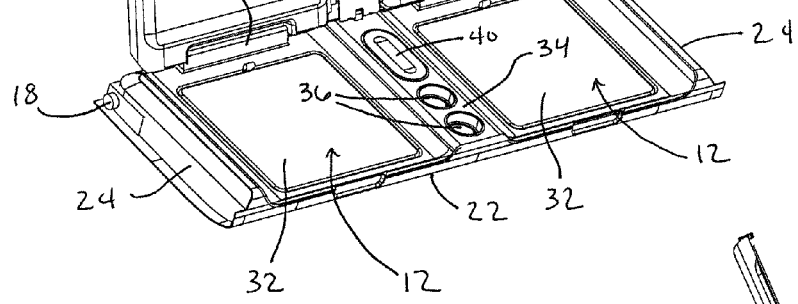
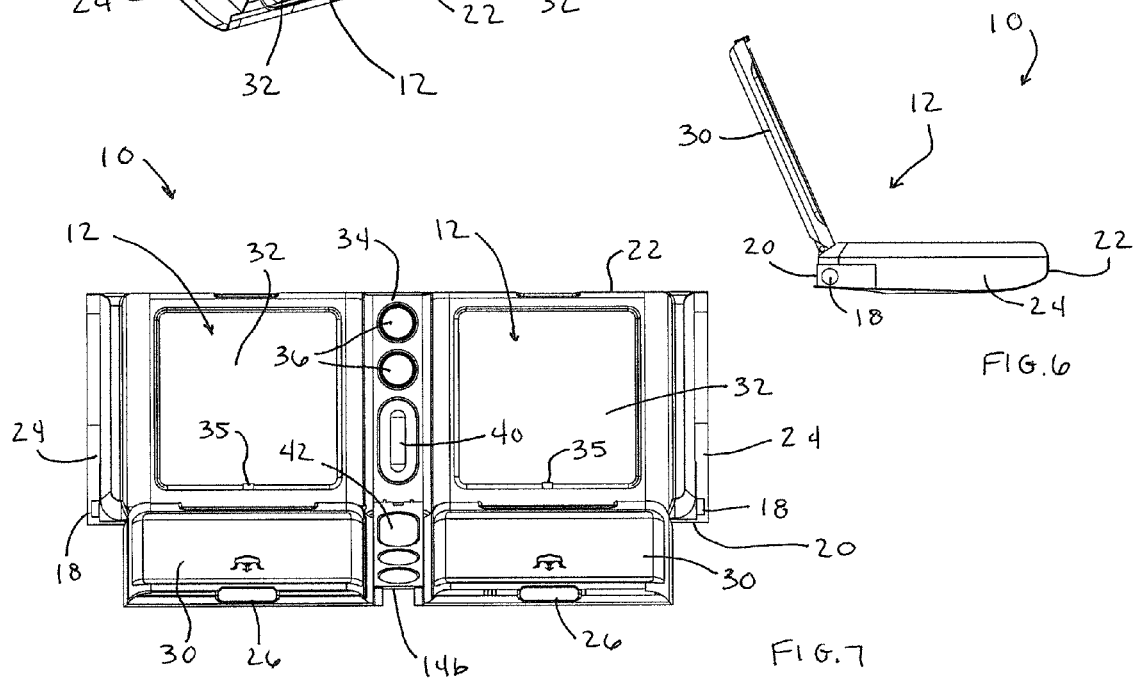

TRUCK TAILGATE AND METHOD OF USE

CROSS REFERENCE TO RELATED APPLICATIONS

This application claims the benefit of U.S. Provisional Application No. 61/944,182, filed Feb. 25, 2014, the contents of which are incorporated herein by reference.

BACKGROUND OF THE INVENTION

The present invention generally relates to automotive accessories including tailgates of types used in pickup trucks and other vehicles. The invention particularly relates to tailgates equipped with integral seating.

Sports fans, concert-goers, and others attending group events often participate in outdoor gatherings before such events, and such gatherings often include meals. Further, construction workers often eat meals outdoors at their job sites, and campers, hunters, and other individuals participating in outdoor activities often eat meals at a campsite. If a pickup truck is present, these individuals may find it convenient or comfortable to sit on the open tailgate of the truck, particularly under conditions in which seating is limited or otherwise unacceptable, for example, due to weather or ground conditions, e.g., mud, water, etc. While an open tailgate offers convenience for outdoor seating, tailgates offer limited comfort and features.

BRIEF DESCRIPTION OF THE INVENTION

The present invention provides a tailgate of a type used in pickup trucks and other vehicles, and a method of operating such a tailgate, wherein the tailgate is configured to include seating capable of offering comfort and additional features.

According to one aspect of the invention, the tailgate includes a front/interior side, an oppositely-disposed rear/exterior side, lateral ends, and hinges disposed at the lateral ends and configured for pivotably coupling the tailgate to a vehicle. The tailgate further includes at least a first seat integrated into the tailgate between the front/interior side, the rear/exterior side, and the lateral ends. The seat comprises a seat back defined by a first rotatable portion of the front/interior side, and a seat cushion that is recessed into an interior region of the tailgate between the front/interior and rear/exterior sides. The seat cushion is exposed by rotating the seat back from a closed position in which the seat back is aligned with the front/interior side to an open position in which the seat back is deployed away from the front/interior side.

According to another aspect of the invention, a method of using a tailgate comprising elements as described includes lowering the tailgate from a closed vertical position thereof to a lowered horizontal position thereof, and then rotating the seat back of the first seat from the closed position thereof to the open position thereof to deploy the seat back away from the front/interior side and expose the seat cushion of the first seat.

Technical effects of tailgates and methods as described above preferably include the ability of the tailgate to provide seating capable of offering comfort and additional features.

Other aspects and advantages of this invention will be better appreciated from the following detailed description.

BRIEF DESCRIPTION OF THE DRAWINGS

FIGS. 1 and 2 are perspective views showing, respectively, rear/exterior and front/interior sides of a tailgate in accordance with a nonlimiting embodiment of the present invention.

FIGS. 3 and 4 are, respectively, side and top views of the tailgate of FIGS. 1 and 2.

FIG. 5 is a perspective view showing the tailgate of FIGS. 1 through 4 lowered and with two integrated seats thereof deployed.

FIGS. 6 and 7 are, respectively, side and top views of the lowered tailgate of FIG. 5.

DETAILED DESCRIPTION OF THE INVENTION

The drawings represent a nonlimiting embodiment of a tailgate 10 for a pickup truck, in which the tailgate 10 is configured to provide integrated seats 12 that can be deployed when the tailgate 10 is opened and lowered. To facilitate the description of the embodiment shown in the drawings, relative terms, including but not limited to, "vertical," "horizontal," "lateral," "front," "rear," "side," "forward," "rearward," "upper," "lower," "above," "below," "right," "left," etc., may be used in reference to the orientation of the tailgate 10 when installed on a pickup truck, and therefore are relative terms that indicate the construction, installation and use of the tailgate 10 and therefore help to define the scope of the invention. In particular, the tailgate 10 will be described as having a front/interior side 14 (visible in FIG. 2) that faces forward, for example, into a cargo bay (space) of a vehicle (for example, a pickup truck) on which the tailgate 10 is installed, and an oppositely-disposed rear/exterior side 16 (visible in FIG. 1) that faces the rearward direction of the vehicle. In addition, the tailgate 10 will be described as having a lower end 20, an upper end 22, and lateral ends 24 taken from the perspective of the orientation of the tailgate 10 when in a closed/raised position (vertical orientation) depicted in FIGS. 1, 2 and 3.

As with a conventional tailgate commonly installed on pickup trucks and similarly equipped vehicles, the tailgate 10 can be seen in FIGS. 1 and 2 as having a generally rectangular outline when viewed from the front or rear, with hinges 18 located at its lateral ends 24 and adjacent its lower end 20 for pivotably coupling the tailgate 10 to the vehicle. The hinges 18 can be of any suitable type adapted to pivotally couple a tailgate to a vehicle. The front/interior and rear/exterior sides 14 and 16 of the tailgate 10 may be formed of various materials of types used in the construction of tailgates, and are represented as fabricated to offer a suitable aesthetic effect consistent with the interior (e.g., cargo bay) and exterior of the vehicle on which the tailgate 10 is installed. As nonlimiting examples, the front/interior side 14 of the tailgate 10 may be fabricated from sheet metal, a high-impact plastic, or any other material that might be used to form or cover the bed of the cargo bay of the vehicle, and the rear/exterior side 16 of the tailgate 10 may be fabricated from steel, fiberglass, composite materials, or any other material that might be used to form outer panels of the vehicle.

The seats 12 are referred to as integrated into the tailgate 10 in the sense that the seats 12 are not removable from the tailgate 10 in their entirety. As evident from FIGS. 1 through 4, which show the seats 12 in closed/stowed positions, the seats 12 are entirely disposed within a three-dimensional space defined by and between the front/interior side 14, rear/exterior side 16, and lateral ends 24 of the tailgate 10, and the seats 12 are effectively concealed. By "concealed," the seats 12 are understood to be not apparent when viewing the tailgate 10 from its front/interior and rear/exterior sides 14 and 16. In particular, the rear/exterior side 16 of the tailgate 10 seen in FIG. 1 does not reveal any indication that the tailgate 10 comprises the integrated seats 12, for example, as a result of the exterior surface of the side 16 being defined by a single continuous panel, and FIG. 2 evidences that portions 14a of the front/interior side 14 that conceal the seats 12 are aligned or coextensive with the front/interior side 14 and are patterned to aesthetically blend in with the remainder of the front/interior side 14.

FIGS. 5 through 7 show the tailgate 10 in an open/lowered position (horizontal orientation) and the seats 12 in open/deployed positions, and that only backs 30 of the seats 12 extend outside the three-dimensional space of the tailgate 10 when in their open/deployed positions. The seats 12 are represented in the depicted embodiment as a pair of seats 12 arranged side-by-side between the lateral ends 24 of the tailgate 10. However, it is foreseeable that a single seat or more than two seats could be incorporated into the tailgate 10.

As evident from a comparison of FIGS. 1 through 3 showing the tailgate 10 in the closed/raised position (vertical orientation) and FIGS. 5 through 7 showing the tailgate 10 in the open/lowered position (horizontal orientation), the seats 12 are accessible through only the front/interior side 14 of the tailgate 10. The seats 12 can be individually deployed by releasing latches 26 located at or adjacent the upper end 22 of the tailgate 10, allowing the backs 30 of the seats 12 to rotate from the closed/stowed position and away from the tailgate 10 at hinges 28 located at or adjacent the lower end 20 of the tailgate 10. As such, each seat back 30 defines one of the portions 14a (hereinafter, concealment portions 14a) of the front/interior side 14 of the tailgate 10 that conceals the corresponding seat 12. In the embodiment shown in the drawings, each seat back 30 (and therefore each concealment portion 14a) constitutes roughly half of the front/interior side 14, with the exception of a central portion 14b of the front/interior side 14 disposed between the concealment portions 14a and two lateral portions 14c of the front/interior side 14 that are separated from the central portion 14b by the concealment portions 14a. The latches 26 can employ any suitable release mechanism, and the hinges 28 can be of any suitable type. The seat backs 30 may have an internal reinforcement structure (not shown) of any suitable type to promote their structural strength and rigidity.

Once the seat backs 30 are deployed (e.g., raised when the tailgate 10 is in its open/lowered position), the seat backs 30 are preferably inclined relative to the tailgate 10 and to a corresponding pair of seat cushions 32 that are exposed as a result of deploying the seat backs 30. As evident from FIGS. 5 and 7, the seat cushions 30 are disposed in recesses that extend into an interior region of the tailgate 10 between the front/interior and rear/exterior sides 14 and 16. If desired, each seat back 30 can be equipped with gas cylinders or other mechanisms to facilitate the manner in which the backs 30 are lowered, raised, and/or secured in their raised/deployed positions. In addition, the seat backs 30 may be adjustable to allow for various reclining positions, for example, with the use of an electric motor (not shown). The seat backs 30 and cushions 32 are preferably formed by or equipped with a cushion material, for example, injection foam or another suitable substance. The backs 30 and cushions 32 may be upholstered with a durable and easily cleaned material, for example, a microfiber or faux leather fabric. The cushions 32 are preferably releasable and removable from the tailgate 10, for example, by grasping a strap 35, to allow either or both cushions 32 to be transported for use apart from the tailgate 10, for example, as cushions that can be placed on bleachers at a sports venue.

As evident from FIGS. 5 and 7, the seats 12 may be equipped with various accessories and features. For example, FIGS. 5 and 7 show the seat bottoms 32 separated by a console 34 in which cup holders 36 are defined. The cup holders 36 are preferably surfaced with a high impact plastic material and may have variably sized diameters to accommodate small or large beverage containers. The console 34 is preferably closable or coverable with the central portion 14b of the front/interior side 14 of the tailgate 10. For this purpose, the central portion 14b is preferably equipped with a separate hinge 38 that allows it to pivot independently of the seat backs 30. As evident from FIG. 4, in the embodiment shown the central portion 14b is secured in its closed position when either or both seat backs 30 are secured with their latches 26 in their closed/stowed position. Furthermore, the console 34 can remain covered by the central portion 14b when the seat backs 30 are raised. At least the part of the central portion 14b on the front/interior side 14 side of the tailgate 10 is preferably formed of a material that is compatible with that of the front/interior side 14 in terms of both appearance and durability. The console 34 and/or the interior surface 42 of the central portion 14b that faces and engages the console 34 (FIG. 5) are preferably formed of a resilient material that provides for a weatherproof seal therebetween. Such a sealing feature is particularly desirable if the console 34 is equipped with electronic features, for example, a speaker unit 40 represented in FIGS. 5 and 7, for example, comprising one or more Bluetooth speakers. The speaker unit 40 may be detachable and have an internal power supply (for example, a battery) and/or have power supplied thereto by the electrical system of the vehicle on which the tailgate 10 is installed. The tailgate 10 may contain an electrical inverter within its interior, which may also be powered by the electrical system to supply power to one or more utility outlets (not shown) at a standard AC voltage and frequency.

For use in a pickup truck or other vehicle, the tailgate 10 is sized and configured to take the place of a standard tailgate, and may be manufactured as original equipment (OEM) of the vehicle or sold and installed on an aftermarket basis. Consequently, the tailgate 10 is preferably adapted to be secured in the closed/raised position and released to the open/lowered position in any manner compatible with the vehicle in which it is to be installed.

While the invention has been described in terms of a specific embodiment, it is apparent that other forms could be adopted by one skilled in the art. For example, the physical configurations of the tailgate 10 and seats 12 could differ from those shown, and materials and processes/methods other than those noted could be used. Therefore, the scope of the invention is to be limited only by the following claims.

The invention claimed is:

1. A tailgate for a vehicle, the tailgate comprising:
   a front/interior side, an oppositely-disposed rear/exterior side, and lateral ends;
   hinges disposed at the lateral ends and configured for pivotably coupling the tailgate to the vehicle; and
   at least a first seat integrated into the tailgate between the front/interior side, the rear/exterior side, and the lateral ends, the first seat comprising a seat back defined by a first rotatable portion of the front/interior side, the first seat comprising a seat cushion that is recessed into an interior region of the tailgate between the front/interior and rear/exterior sides and is exposed by rotating the seat back from a closed position in which the seat back is aligned with the front/interior side to an open position in which the seat back is deployed away from the front/interior side;

wherein the first seat is entirely disposed within a three-dimensional space defined by and between the front/interior side, the rear/exterior side, and the lateral ends of the tailgate and is concealed by and between the front/interior side, the rear/exterior side, and the lateral ends of the tailgate when in the closed position.

2. The tailgate according to claim 1, wherein only the seat back extends outside of the three-dimensional space when rotated to the open position.

3. The tailgate according to claim 1, wherein the tailgate is configured to be installed as a substitute for a standard tailgate.

4. The tailgate according to claim 1, further comprising at least a second seat integrated into the tailgate between the front/interior side, the rear/exterior side, and the lateral ends, the second seat comprising a seat back defined by a second rotatable portion of the front/interior side, the second seat comprising a seat cushion that is recessed into an interior region of the tailgate between the front/interior and rear/exterior sides and is exposed by rotating the seat back of the second seat from a closed position in which the seat back of the second seat is aligned with the front/interior side to an open position in which the seat back of the second seat is deployed away from the front/interior side.

5. The tailgate according to claim 4, further comprising a console between the seat cushions of the first and second seats.

6. The tailgate according to claim 5, further comprising a cover adapted to cover the console when disposed in a closed position of the cover.

7. The tailgate according to claim 6, wherein the cover is independently rotatable relative to the seat backs of the first and second seats.

8. The tailgate according to claim 7, wherein the cover is secured by the seat backs of the first and second seats in the closed position to cover the console.

9. The tailgate according to claim 6, wherein the cover is defined by a third rotatable portion of the front/interior side between the first and second rotatable portions thereof.

10. The tailgate according to claim 5, further comprising at least one cup holder defined in the console between the seat cushions of the first and second seats.

11. The tailgate according to claim 5, further comprising a speaker unit in the console between the seat cushions of the first and second seats.

12. The tailgate according to claim 1, further comprising a latch for releasably securing the seat back of the first seat in the closed position thereof.

13. The tailgate according to claim 12, wherein the latch is located at an upper end of the tailgate and the hinges of the tailgate are located at an oppositely-disposed lower end of the tailgate.

14. The tailgate according to claim 1, wherein the seat cushion is removable from the tailgate to allow the seat cushion to be transported for use apart from the tailgate without removing the first seat from the tailgate.

15. The tailgate according to claim 1, wherein the tailgate is installed on the vehicle.

16. The tailgate according to claim 15, wherein the tailgate is an original equipment of the vehicle.

17. The tailgate according to claim 1, wherein the tailgate is an aftermarket product configured to be installed on the vehicle.

18. A method of operating the tailgate of claim 1 while the tailgate is installed on the vehicle, the method comprising:
   lowering the tailgate from a closed vertical position thereof to a lowered horizontal position thereof; and then
   rotating the seat back of the first seat from the closed position thereof to the open position thereof to deploy the seat back away from the front/interior side and expose the seat cushion of the first seat.

19. A method of operating the tailgate of claim 4 while the tailgate is installed on the vehicle, the method comprising:
   lowering the tailgate from a closed vertical position thereof to a lowered horizontal position thereof; and then
   rotating either or both of the seat backs of the first and second seats from the closed positions thereof to the open positions thereof to deploy either or both of the seat backs away from the front/interior side and expose the seat cushions of either or both of the first and second seats.

20. A method of operating the tailgate of claim 9 while the tailgate is installed on the vehicle, the method comprising:
   lowering the tailgate from a closed vertical position thereof to a lowered horizontal position thereof;
   rotating the seat backs of the first and second seats from the closed positions thereof to the open positions thereof to deploy the seat backs away from the front/interior side and expose the seat cushions of the first and second seats; and then
   rotating the third rotatable portion of the front/interior side to expose the console.

* * * * *